(12) United States Patent
Jonytis et al.

(10) Patent No.: US 11,811,518 B2
(45) Date of Patent: *Nov. 7, 2023

(54) ENABLING EFFICIENT COMMUNICATION IN A HYBRID NETWORK

(71) Applicant: UAB 360 IT, Vilnius (LT)

(72) Inventors: Mantas Jonytis, Grigiskes (LT); Rytis Karpuška, Vilniaus r. (LT)

(73) Assignee: UAB 360 IT, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/557,959

(22) Filed: Dec. 21, 2021

(65) Prior Publication Data

US 2023/0198901 A1 Jun. 22, 2023

Related U.S. Application Data

(63) Continuation of application No. 17/556,886, filed on Dec. 20, 2021, now Pat. No. 11,575,654.

(51) Int. Cl.
*H04L 9/40* (2022.01)
*H04L 12/46* (2006.01)
*H04L 67/141* (2022.01)
*H04L 45/00* (2022.01)
(Continued)

(52) U.S. Cl.
CPC ...... *H04L 63/0272* (2013.01); *H04L 12/4633* (2013.01); *H04L 12/4641* (2013.01); *H04L 45/22* (2013.01); *H04L 45/74* (2013.01); *H04L 63/0236* (2013.01); *H04L 63/0435* (2013.01); *H04L 63/0485* (2013.01);
(Continued)

(58) Field of Classification Search
CPC ... H04L 63/0272; H04L 63/20; H04L 63/166; H04L 63/0435; H04L 12/4633; H04L 12/4641; H04L 67/141; H04L 63/0236; H04L 63/0485; H04L 45/22; H04L 45/74; H04L 67/12
USPC .......................................................... 726/15
See application file for complete search history.

(56) References Cited

U.S. PATENT DOCUMENTS

| | | | |
|---|---|---|---|
| 9,973,534 B2 | 5/2018 | Mahaffey et al. | |
| 2015/0128205 A1* | 5/2015 | Mahaffey | H04L 63/105 726/1 |
| 2019/0288860 A1* | 9/2019 | Poltorak | H04W 12/033 |

(Continued)

OTHER PUBLICATIONS

Lucian Constain, Mesh VPNs Explained—Another step toward zero-trust net working, Sep. 16, 2020.

*Primary Examiner* — Benjamin A Kaplan
(74) *Attorney, Agent, or Firm* — The Pattani Law Group

(57) ABSTRACT

A method including monitoring, by a processor associated with a first device having an established VPN connection with a VPN server and an established meshnet connection with a second device, communication of transmission packets to be transmitted by the first device; receiving, by the processor, a transmission packet to be transmitted by the first device; determining, by the processor, a destination associated with the transmission packet based at least in part on metadata included in the transmission packet; and routing, by the processor, the transmission packet for transmission via the VPN connection or for transmission via the meshnet connection based at least in part on determining whether the second device is the destination associated with the transmission packet. Various other aspects are contemplated.

20 Claims, 9 Drawing Sheets

(51) Int. Cl.
*H04L 45/74* (2022.01)
*H04L 67/12* (2022.01)

(52) U.S. Cl.
CPC ............ *H04L 63/166* (2013.01); *H04L 63/20* (2013.01); *H04L 67/12* (2013.01); *H04L 67/141* (2013.01)

(56) References Cited

U.S. PATENT DOCUMENTS

2021/0194894 A1   6/2021  Anderson et al.
2023/0028642 A1*  1/2023  Li ....................... H04L 63/0435

* cited by examiner

ENABLING EFFICIENT COMMUNICATION IN A HYBRID NETWORK

CROSS REFERENCE

This application is a continuation of U.S. Non-Provisional patent application Ser. No. 17/556,886, filed on Dec. 20, 2021, and titled "Enabling Efficient Communication In A Hybrid Network," the entire contents of which are incorporated herein by reference.

FIELD OF DISCLOSURE

Aspects of the present disclosure generally relate to communications in networks, and more particularly to enabling efficient communication in a hybrid network including a virtual private network and a mesh network.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. In an example, encoded/encrypted data may be decoded/decrypted with only a correct decryption key. In a VPN, encryption may render the communicated data unreadable or indecipherable to any third party. At a basic level, when the user launches the installed client application and connects to the VPN server, the client application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the client application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger the encryption is.

VPNs may employ user authentication, which may involve verification of credentials required to confirm authenticity/identity of the user. For instance, when a user launches the client application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the client application may connect with a selected VPN server for secure communication of data via the virtual tunnel.

The client application, installed on the user device, may utilize software-based technology to establish a secure connection between the user device and a VPN server. Some client applications may automatically work in the background on the user device while other client applications may include front-end interfaces to allow the user to interact with and configure the client applications. Client applications may often be installed on a computer (e.g., user device), though some entities may provide a purpose-built client application as a hardware device that is pre-installed with software to enable the VPN. Typically, a client application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

Additionally, users may rely on mesh networks (also referred to as "meshnets") to communicate (e.g., transmit and/or receive) data among a plurality of endpoints (e.g., user devices) via one or more Internet nodes (e.g., bridges, switches, infrastructure devices, etc.). In an example, a mesh network may include a plurality of endpoints communicatively coupled to each other directly or via the one or more Internet nodes. A mesh network in which all endpoints are communicatively coupled to each other may be referred to as a fully connected mesh network. Data transmitted by a first endpoint, from among the plurality of endpoints, may be routed over the Internet via the one or more Internet nodes to a second endpoint from among the plurality of endpoints. Also, data transmitted by the first endpoint may be routed to two or more endpoints from among the plurality of endpoints.

In a mesh network, the plurality of endpoints may cooperate with each other to enable communication of the data among the plurality of endpoints. In an example, one or more of the endpoints may participate in communication of the data. In this way, the mesh network may avoid relying on a given endpoint for communication of the data. Some mesh networks may have the ability to dynamically self-organize and self-configure the plurality of endpoints. This ability may allow such mesh networks to enable dynamic distribution of workloads, particularly in the event that one or more endpoints should fail.

SUMMARY

In one aspect, the present disclosure contemplates a method including determining, by a processor having an established virtual private network (VPN) connection with a VPN server and an established meshnet connection with an endpoint in a mesh network, that a destination associated with a transmission packet to be transmitted by the device is the endpoint; and transmitting, by the processor, the transmission packet utilizing the meshnet connection based at least in part on determining that the destination is the endpoint.

In another aspect, the present disclosure contemplates a device including a memory and a processor, the memory and the processor having an established virtual private network (VPN) connection with a VPN server and an established meshnet connection with an endpoint in a mesh network, and being configured to: determine that a destination associated with a transmission packet to be transmitted by the device is the endpoint; and transmit the transmission packet utilizing the meshnet connection based at least in part on determining that the destination is the endpoint.

In another aspect, the present disclosure contemplates a non-transitory computer readable medium storing instructions, which when executed by a processor having an established virtual private network (VPN) connection with a VPN server and an established meshnet connection with an endpoint in a mesh network, cause the processor to: determine that a destination associated with a transmission packet to be transmitted by the device is the endpoint; and transmit the transmission packet utilizing the meshnet connection based at least in part on determining that the destination is the endpoint.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
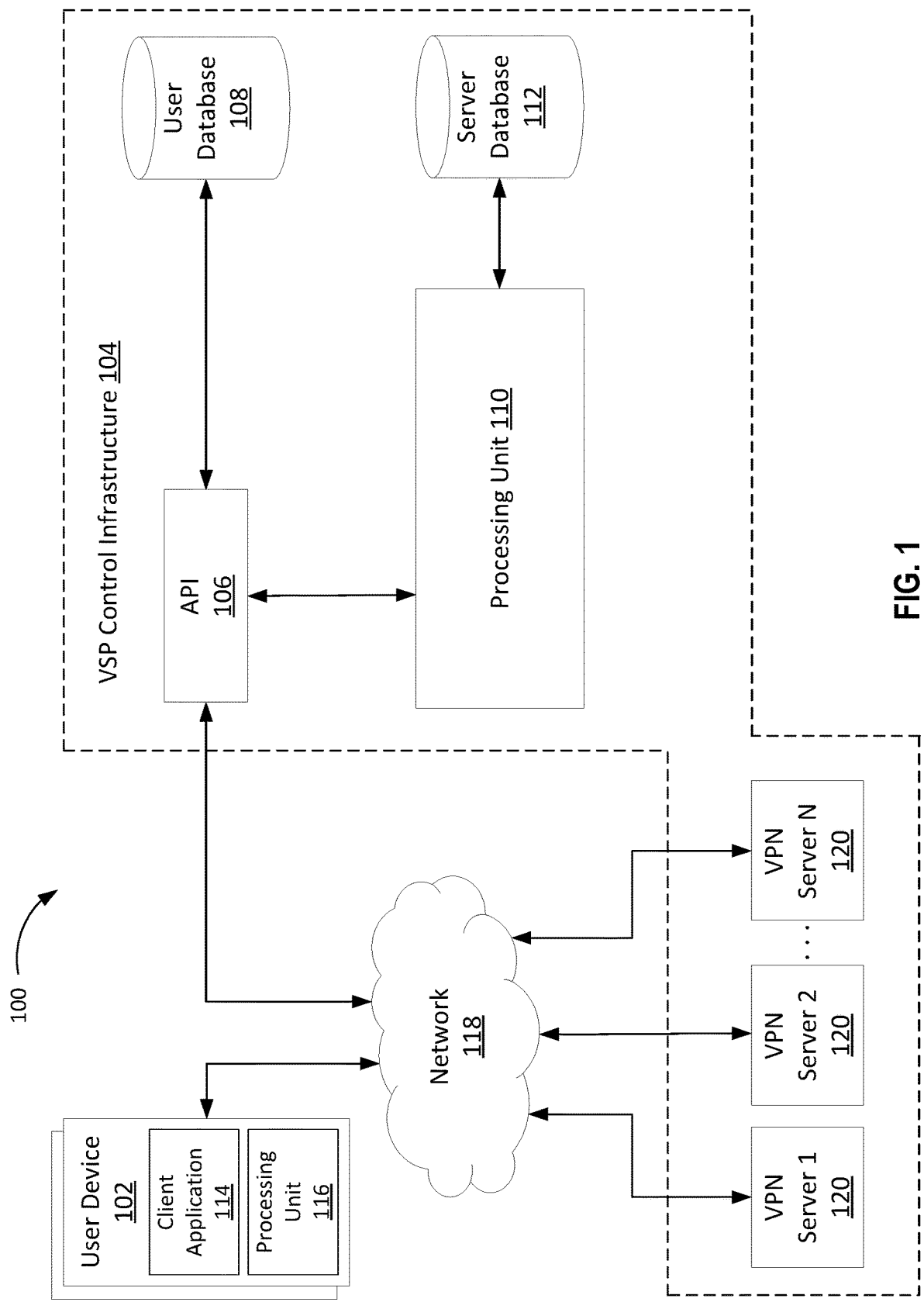

FIG. 1 is an illustration of an example system associated with enabling efficient communication in a hybrid network, according to various aspects of the present disclosure.

Figure 2:
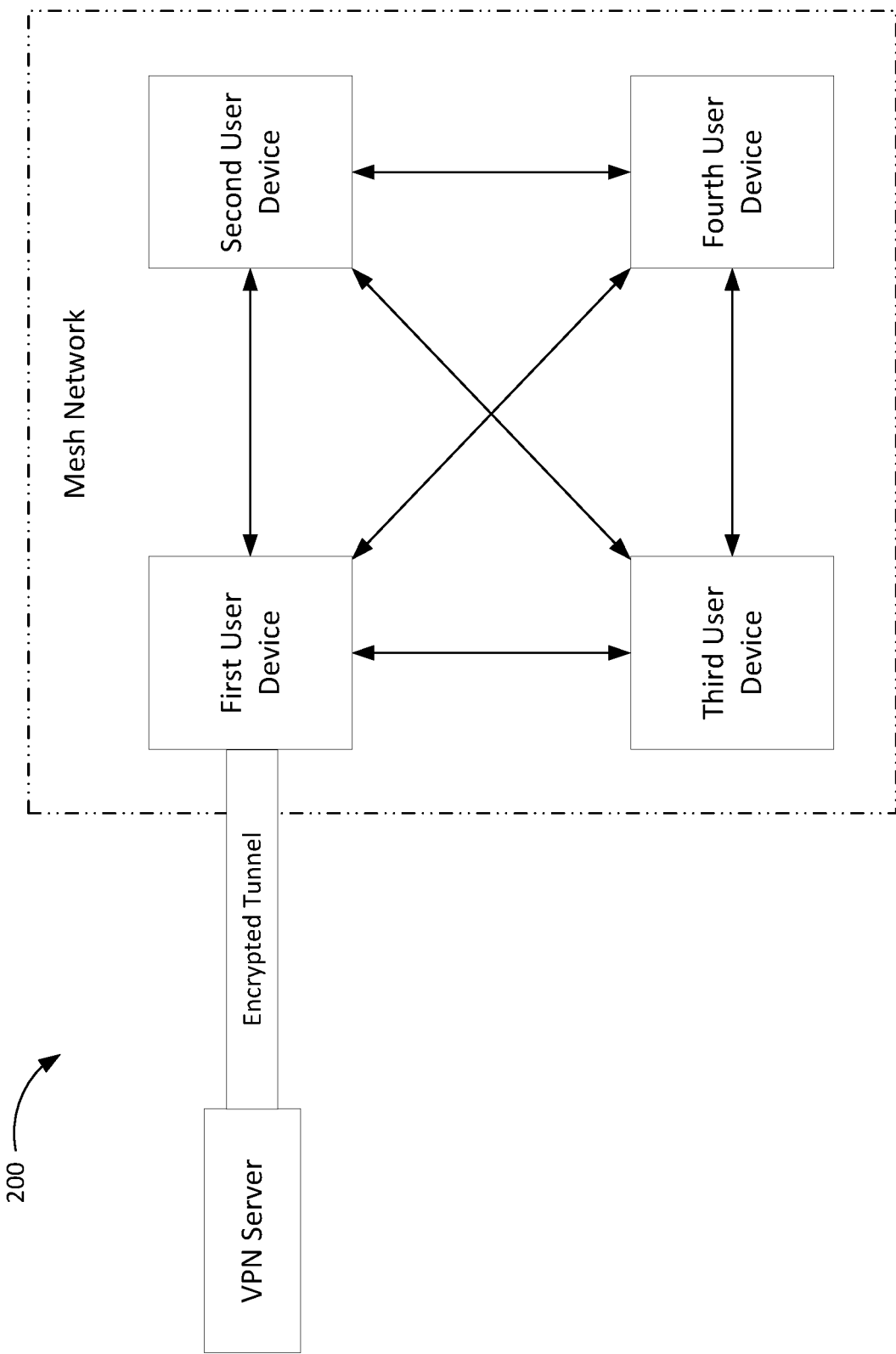

FIG. 2 is an illustration of an example associated with enabling efficient communication in a hybrid network, according to various aspects of the present disclosure.

Figure 3:
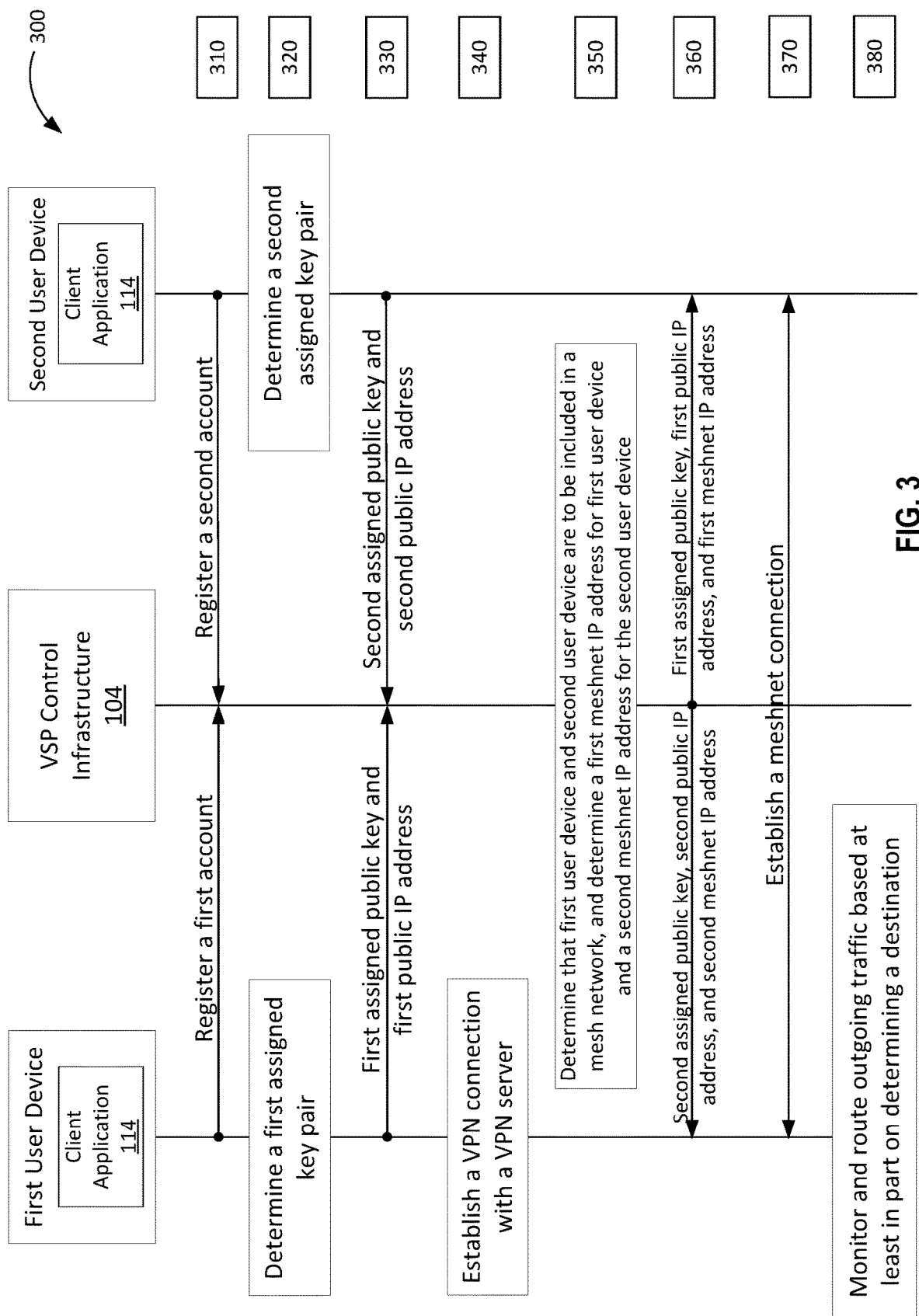

FIG. 3 is an illustration of an example flow associated with enabling efficient communication in a hybrid network, according to various aspects of the present disclosure.

Figure 4:
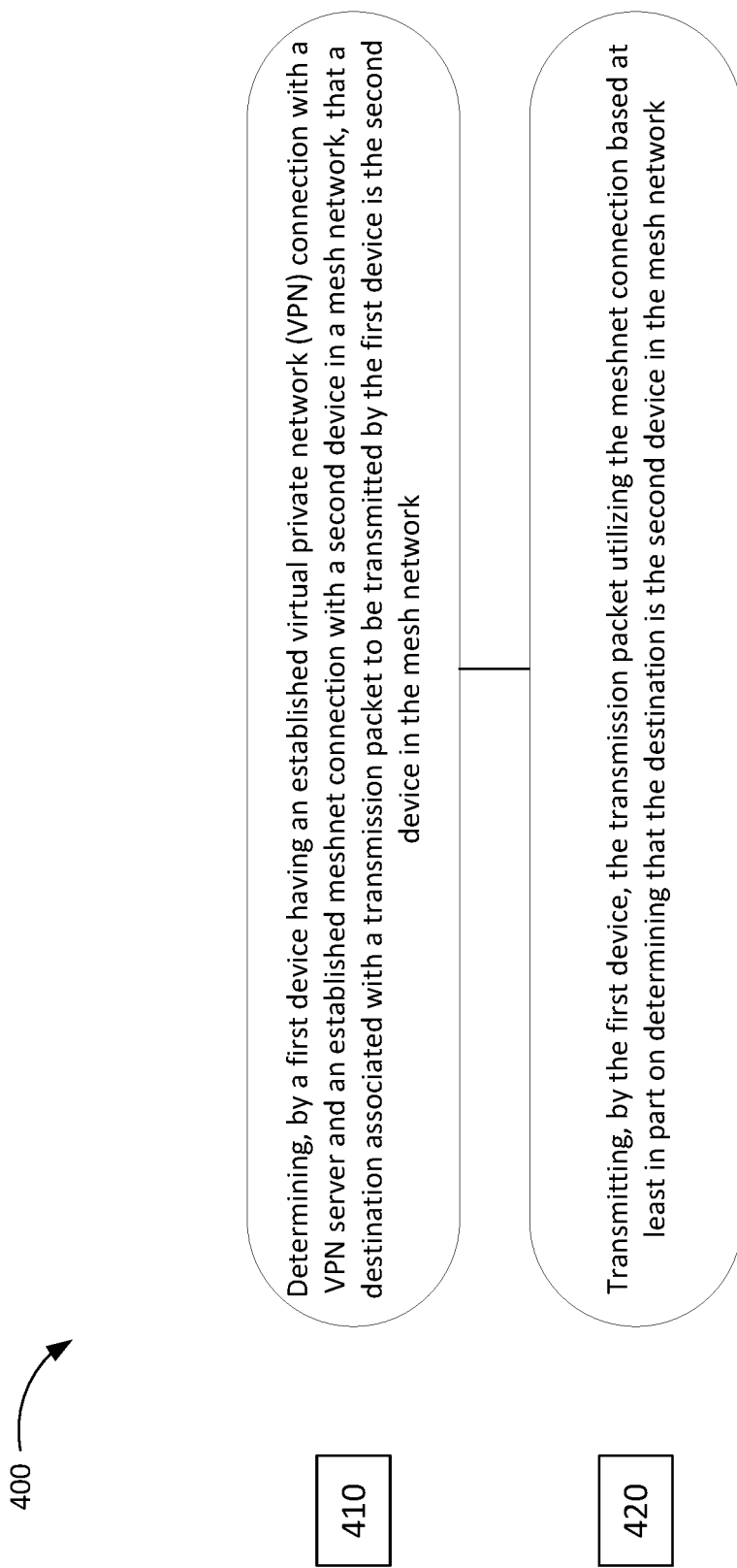

FIG. 4 is an illustration of an example process associated with enabling efficient communication in a hybrid network, according to various aspects of the present disclosure.

Figure 5:
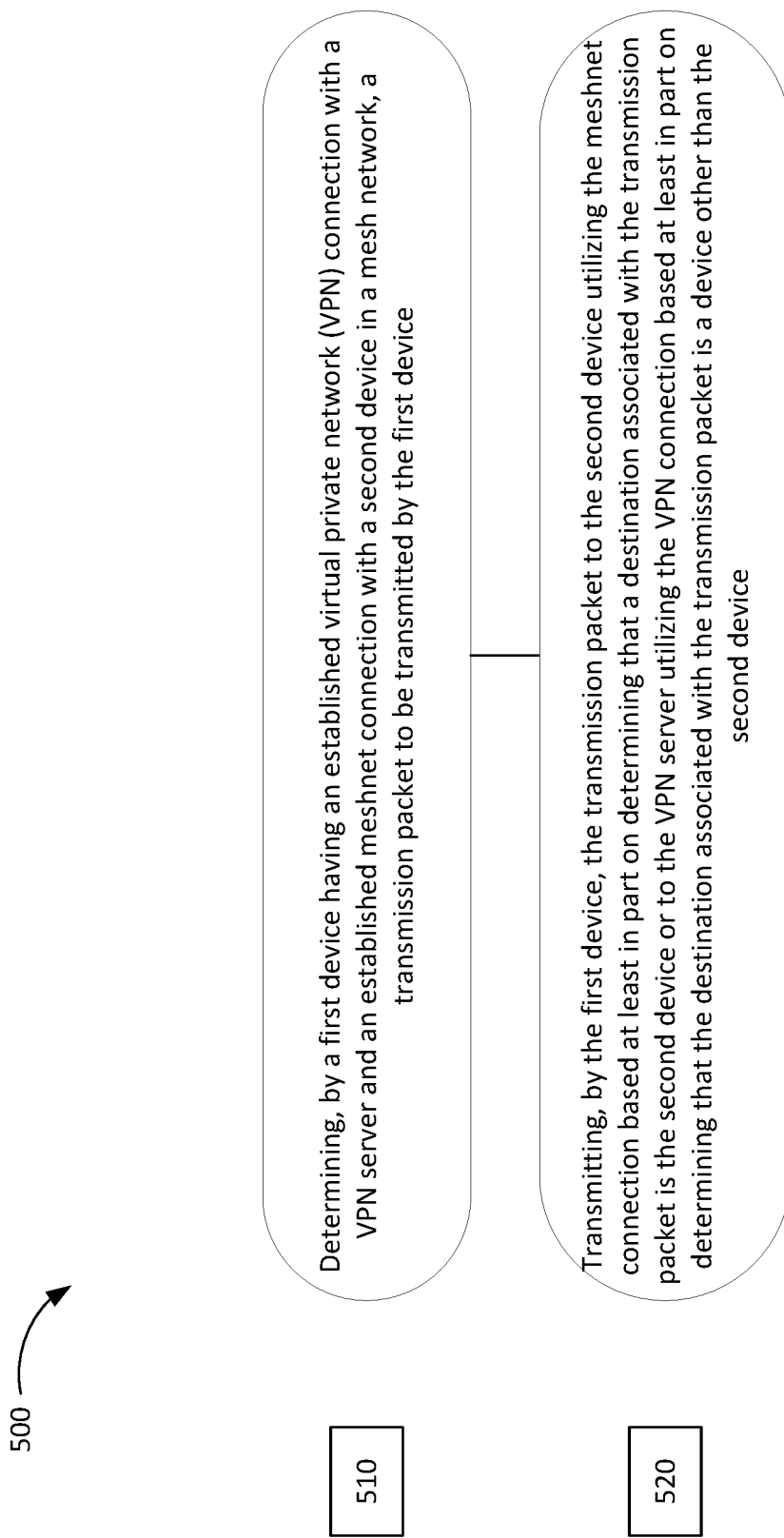

FIG. 5 is an illustration of an example process associated with enabling efficient communication in a hybrid network, according to various aspects of the present disclosure.

Figure 6:
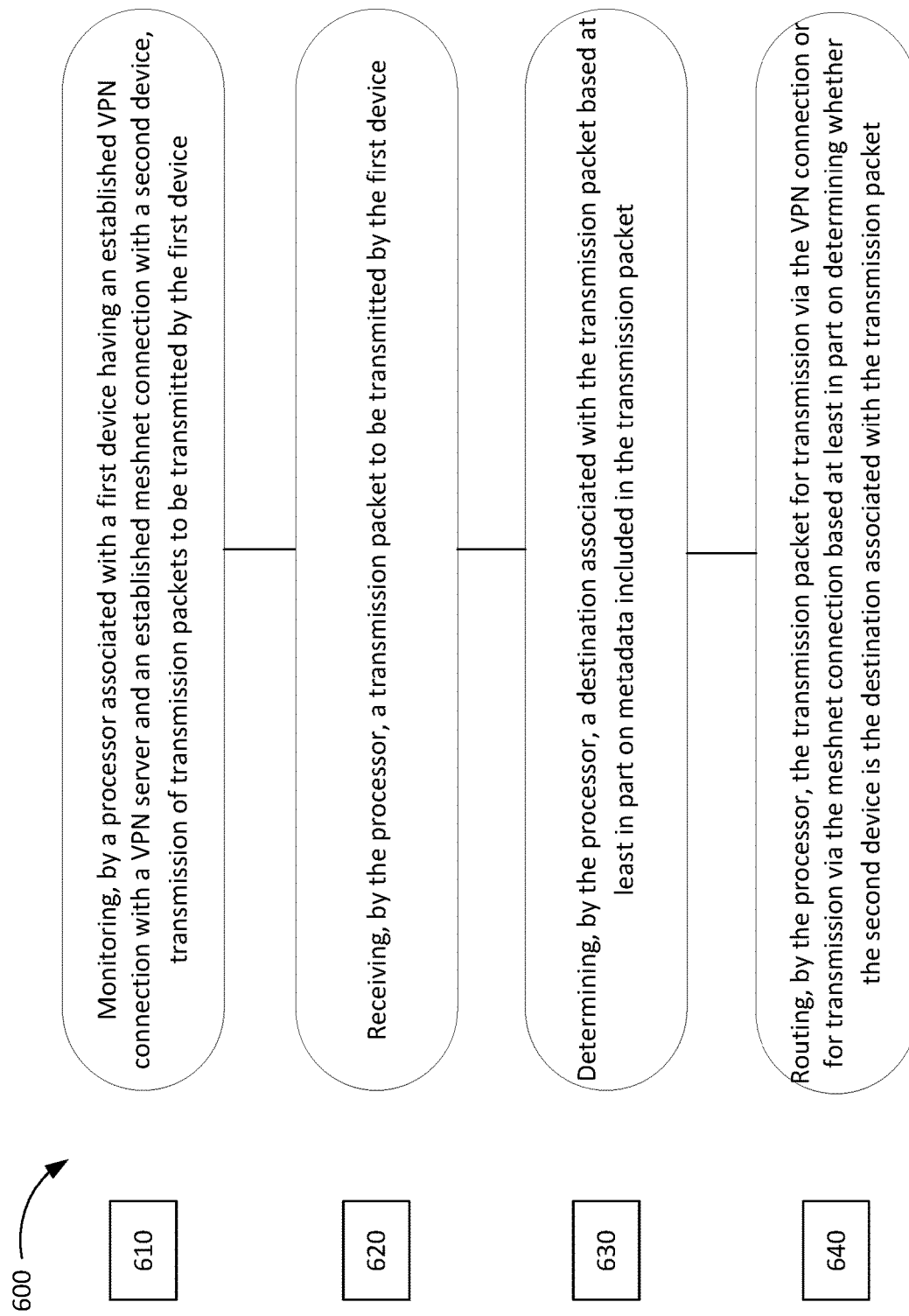

FIG. 6 is an illustration of an example process associated with enabling efficient communication in a hybrid network, according to various aspects of the present disclosure.

Figure 7:
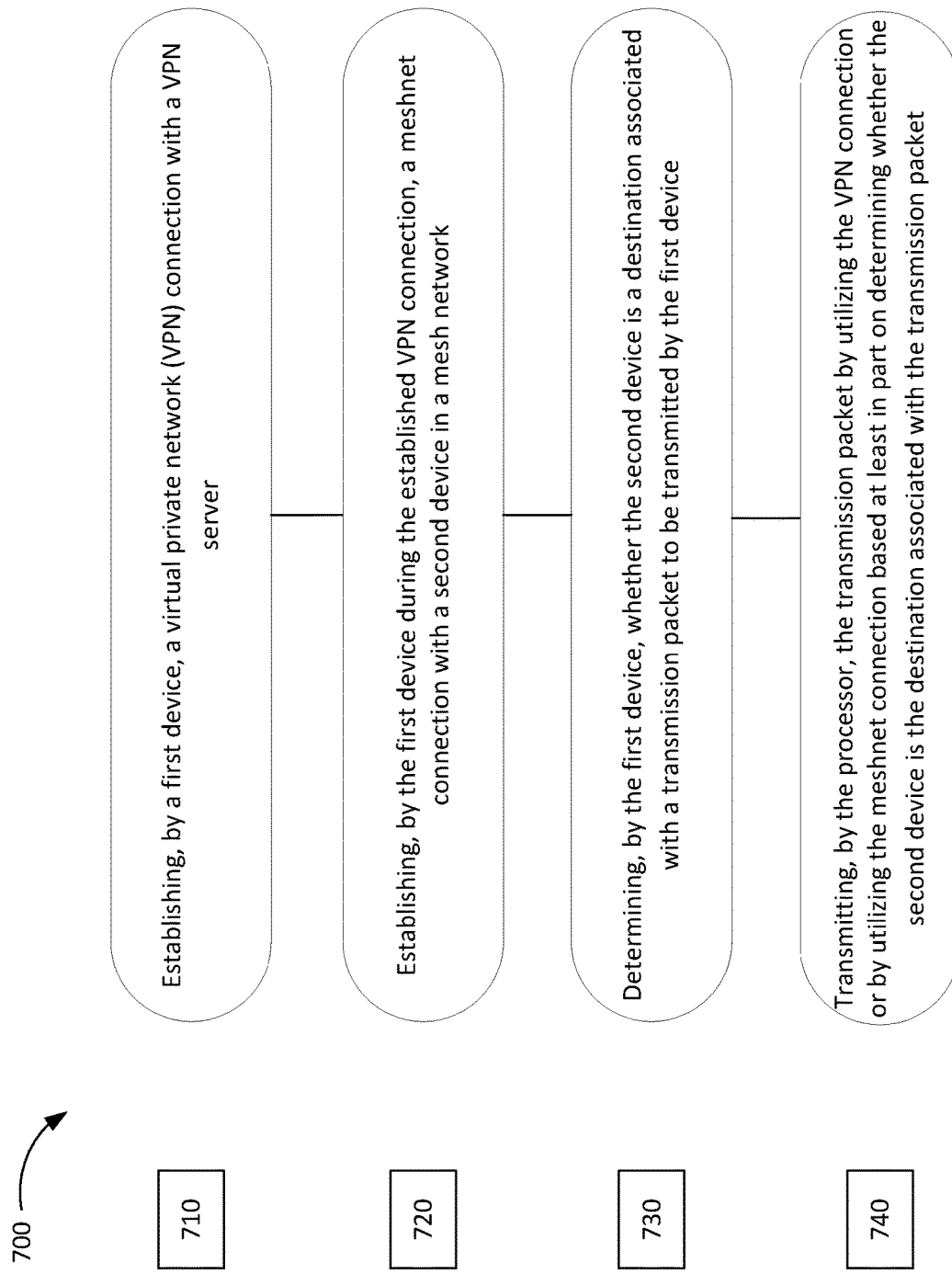

FIG. 7 is an illustration of an example process associated with enabling efficient communication in a hybrid network, according to various aspects of the present disclosure.

Figure 8:
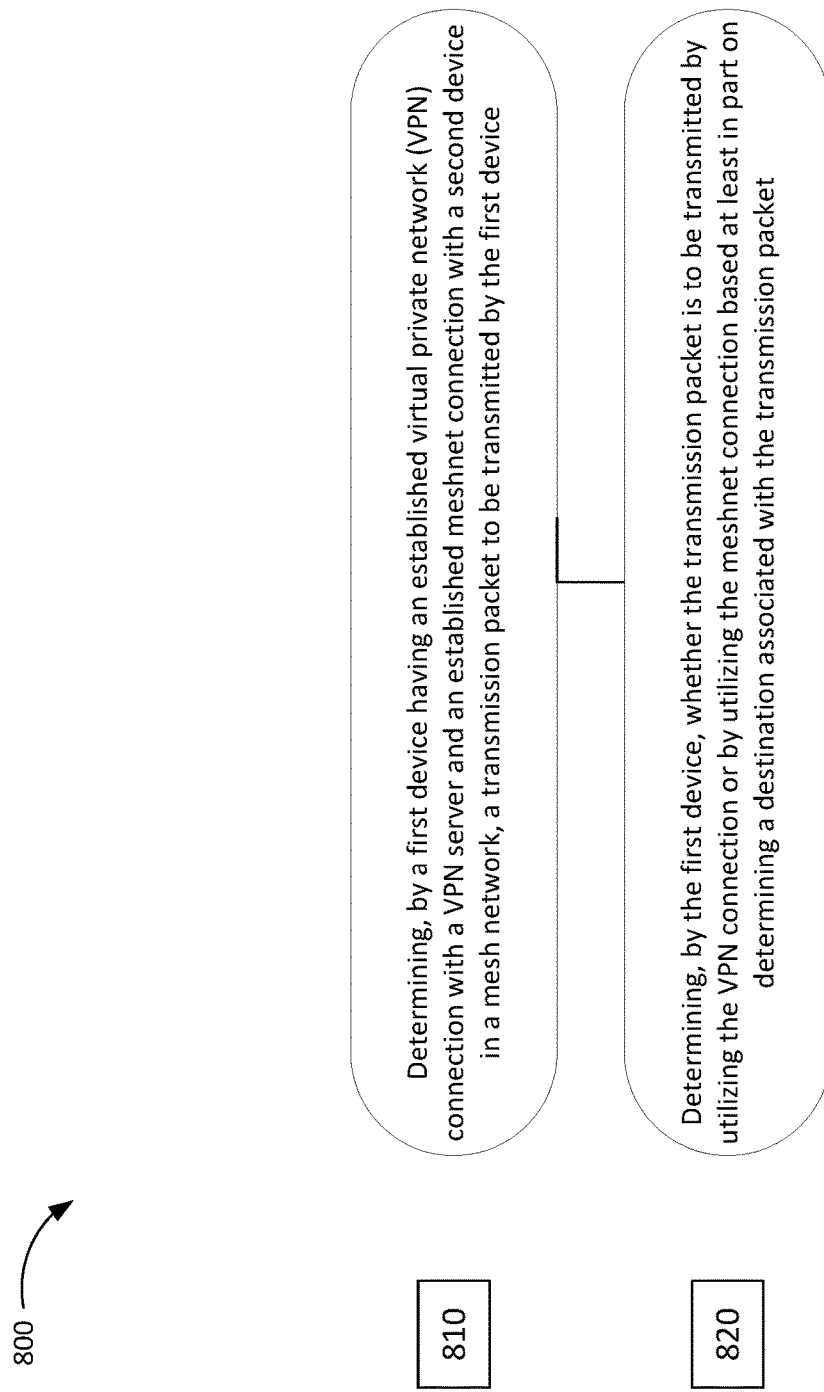

FIG. 8 is an illustration of an example process associated with enabling efficient communication in a hybrid network, according to various aspects of the present disclosure.

Figure 9:
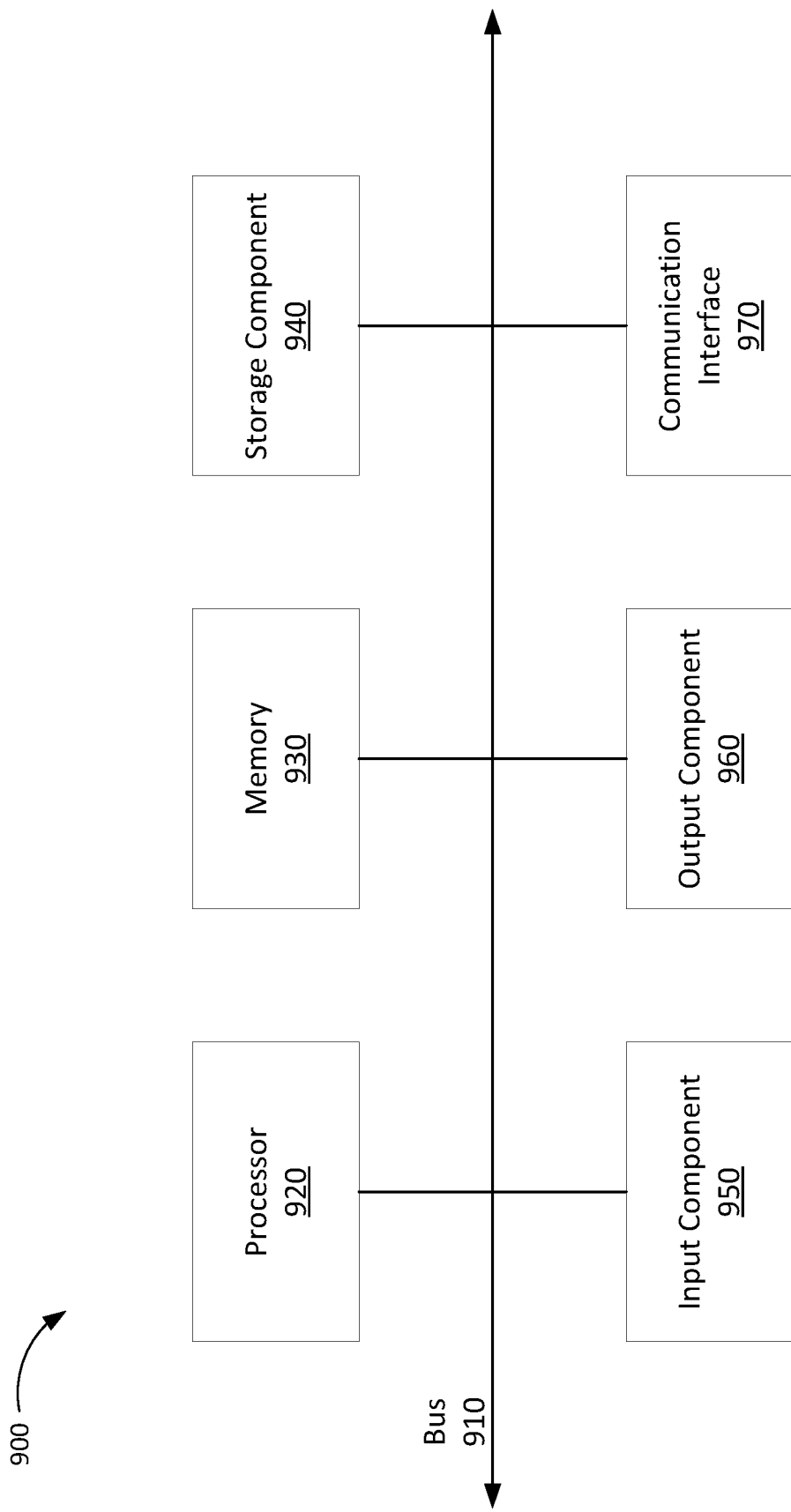

FIG. 9 is an illustration of example devices associated with enabling efficient communication in a hybrid network, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example 100 associated with enabling efficient communication in a hybrid network, according to various aspects of the present disclosure. Example 100 shows an architectural depiction of included components. In some aspects, the components may include one or more user devices 102 capable of communicating with a VPN service provider (VSP) control infrastructure 104 and with one or more VPN servers 120 for obtaining VPN services and/or mesh network services. The one or more user devices 102 may communicate with the VSP control infrastructure 104 and with the one or more VPN servers 120 over a network 118. The VSP control infrastructure 104 may be controlled by a VPN service provider and may include an application programming interface (API) 106, a user database 108, a processing unit 110, a server database 112, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 118. The processing unit 110 may be capable of configuring and controlling operation of the one or more VPN servers 120 and of an authentication server (not shown). In some aspects, the one or more VPN servers 120 may be configured to communicate with the authentication server to authenticate a user device 102 prior to providing the VPN services and/or mesh network services.

The user device 102 may be a physical computing device capable of hosting a client application and of connecting to the network 118. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 118 may be any digital telecommunication network that permits several nodes to share and access resources. In some aspects, the network 118 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of the VPN services and/or mesh network services to the user device 102. The VSP control infrastructure 104 may interface with (the client application 114 on) the user device 102 via the API 106, which may include one or more endpoints to a defined message system. In some aspects, the API 106 may be configured to receive, via the network 118, a connection request from the user device 102 to establish a VPN connection with a VPN server 120. The connection request may include an authentication request to authenticate the user device 102 and/or a request for an entry IP address of an optimal VPN server for establishment of the VPN connection therewith. In some aspects, an optimal VPN server may be a single VPN server 120 or a combination of one or more VPN servers 120. The API 106 may receive the authentication request and the request for the entry IP address of the optimal VPN server in a single connection request. In some aspects, the API 106 may receive the authentication request and the request for the entry IP address of the optimal VPN server in separate connection requests.

The API 106 may further be configured to handle the connection request by mediating the authentication request. For instance, the API 106 may receive from the user device 102 credentials including, for example, a unique combination of a user ID and password (associated with a registered account) for purposes of authenticating the user device 102. In another example, the credentials may include a unique validation code known to an authentic user. The API 106 may provide the received credentials to the user database 108 for verification.

The user database 108 may include a structured repository of valid credentials associated with registered accounts. In one example, the structured repository may include one or more tables containing valid unique combinations of user IDs and passwords (e.g., password hashes) associated with registered accounts. In another example, the structured repository may include one or more tables containing valid unique validation codes associated with registered accounts. The VPN service provider may add, delete, and/or modify such valid unique combinations of user IDs and passwords from the structured repository. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may enable the user device 102 to obtain the VPN services and/or mesh network services. When the received credentials fail to match at least one of the valid credentials, the user database 108 and the processor may fail to authenticate the user device 102. In this case, the VPN service provider may decline to provide the VPN services and/or mesh network services to the user device 102.

When the user device 102 is authenticated, the user device 102 may initiate a VPN connection and may transmit to the API 106 a request for the entry IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120.

In some aspects, the processing unit 110 may be a logical unit including a scoring engine. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120. In some aspects, based at least in part on server penalty scores calculated utilizing the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

The user device 102 may transmit to the optimal VPN server an initiation request to establish a VPN connection (e.g., an encrypted tunnel) with the optimal VPN server. The optimal VPN server with which the user device establishes the encrypted tunnel may be referred to as a primary VPN server or an entry VPN server. Based at least in part on receiving the initiation request, the optimal VPN server may conduct a VPN authentication with the authentication server to authenticate the user device 102 as a device that may receive the VPN services from the optimal VPN server. When the VPN authentication is successful, the optimal VPN server may proceed to provide the VPN services and/or mesh network services to the user device 102. Alternatively, when the VPN authentication fails, the optimal VPN server may refrain from providing the VPN services and/or mesh network services to the user device 102 and/or may communicate with the user device 102 to obtain additional information to authenticate the user device 102.

In some aspects, a VPN server 120 may include a piece of physical or virtual computer hardware and/or software capable of securely communicating with (the VPN client application on) the user device 102 for provision of VPN services. Similarly, the authentication server may include a piece of physical or virtual computer hardware and/or software capable of securely communicating with one or more VPN servers 120 for provision of authentication services.

With respect to mesh network services, the processing unit 110 included in the VSP control infrastructure 104 may be configured to determine a mesh network associated with the user device 102 and/or to identify one or more user devices to be included within the determined mesh network. The processing unit 110 may utilize the API 106 to transmit information associated with the mesh network and/or the identified one or more user devices to the user device 102. The user device 102 may transmit an initiation request to establish meshnet connections (e.g., encrypted medium) with the one or more user devices. In some aspects, the one or more user devices with which the user device 102 establishes the meshnet connections may also host respective client applications for communicating with the VSP control infrastructure 104 and/or with the user device 102.

One or more components (e.g., API 106, user database 108, processing unit 110, and/or server database 112, processing unit 116) included in the VSP control infrastructure 104 and/or included in the user device 102 may further be associated with a controller/processor, a memory, a communication interface, or a combination thereof (e.g., FIG. 9). For instance, the one or more components of the set of components may include or may be included in a controller/processor, a memory, or a combination thereof. In some aspects, the one or more of the components included in the VSP control infrastructure 104 and/or the user device 102 may be separate and distinct from each other. Alternatively, in some aspects, one or more of the components included in the VSP control infrastructure 104 and/or the user device 102 may be combined with one or more of other components included in the VSP control infrastructure 104. In some aspects, the one or more of the components included in the VSP control infrastructure 104 and/or the user device 102 may be local with respect to each other. Alternatively, in some aspects, one or more of the components included in the VSP control infrastructure 104 and/or the user device 102 may be located remotely with respect to one or more of other components included in the VSP control infrastructure 104 and/or the user device 102. Additionally, or alternatively, one or more components of the components included in the VSP control infrastructure 104 and/or the user device 102 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

One or more user devices may rely on a mesh network to communicate (e.g., transmit and/or receive) data. In example 200 shown in FIG. 2, a first user device, a second user device, a third user device, and a fourth user device may rely on a mesh network to communicate data with each other. The data may be communicated using wired communications and/or wireless communications over a network such as, for example, the Internet. The communicated data may include any information including digital information such as, for example, files, documents, text data, voice data, image data, signal data, and/or video data. Further, the mesh network may be a secure mesh network that may enable the user devices to communicate the data in encrypted form. To communicate the data, the one or more user devices may utilize respective mesh client applications.

Although the mesh network may enable the communicated data to be encrypted, information communicated outside the mesh network may take place over the open Internet (e.g., clearnet) in unencrypted form. In some cases, the information may include private information (e.g., locations of the one or more user devices, private/sensitive information associated with users of the one or more user devices, or the like) associated with the user devices. In this case, the information communicated outside the mesh network may be monitored and/or intercepted by a malicious third party.

Such monitoring and/or interception may allow the malicious third party to discover, track, and manipulate the private information. As a result, the private information may become compromised, and the one or more user devices may be unable to, among other things, privately send and receive data across public networks.

To mitigate instances of the private information becoming compromised, the one or more user devices may utilize respective VPN client applications to establish a VPN connection and to privately send and receive data across the clearnet. In the example 200 shown in FIG. 2, the first user device may utilize a first VPN client application to establish an encrypted tunnel (e.g., a VPN connection) with a VPN server, as discussed elsewhere herein, to privately send and receive data across the clearnet.

Once the first user device has established the encrypted tunnel with the VPN server, all communications transmitted by the first user device may be intercepted by the VPN client application and may be transmitted via the encrypted tunnel. Such communications may include data transmitted to the one or more user devices in the mesh network. In an example, data transmitted by the first user device to the second user device (and/or to the third user device and/or to the fourth user device) utilizing the meshnet client application may be intercepted by the VPN client application and may be transmitted via the encrypted tunnel to the VPN server, which may then relay the data to the second user device (and/or to the third user device and/or to the fourth user device).

The relay of data, transmitted by the first device to the second user device, via the VPN server may result in inefficient utilization of VPN resources (e.g., processing resources, management resources, memory resources, network bandwidth, power consumption, etc.), which may otherwise be utilized to perform suitable tasks associated with providing VPN services. Additionally, a plurality of hops may be unnecessarily added between the first user device and the second user device, thereby increasing consumption of network resources (e.g., internet nodes, etc.) and introducing a delay in the data being received by the second user device. The relay of data may also result in underutilization of existing mesh network resources (e.g., connection between the first user device and the second user device) that are dedicated for communication of data between the first user device and the second user device. Further, a user device may have to utilize a mesh client application to securely communicate data in the mesh network and utilize a separate, VPN client application to privately communicate data via the VPN network.

Various aspects of systems and techniques discussed in the present disclosure may enable efficient communication in a hybrid network, which may include a VPN network and a secure mesh network enabled by a VSP control infrastructure. In some aspects, the VSP control infrastructure may configure and provide a single client application to be installed on a user device. The single client application may enable the user device to securely and efficiently communicate data via the VPN network and via the secure mesh network. In an example, the single client application may enable the user device to establish an encrypted tunnel (e.g., VPN connection) with a VPN server to communicate encrypted data over the clearnet and to establish one or more meshnet connections with one or more endpoints included in the secure mesh network to communicate encrypted data within the secure mesh network. In some aspects, the client application may determine, based at least in part on determining a destination of a transmission packet (e.g., packet transmitted by the user device), whether the transmission packet is to be transmitted via the encrypted tunnel or via the one or more meshnet connections. When the client application determines that the destination of the transmission packet is the one or more endpoints in the mesh network, the client application may transmit the transmission packet via the one or more meshnet connections to the one or more endpoints. Alternatively, when the client application determines that the destination of the transmission packet is a device other than the one or more endpoints, the client application may transmit the transmission packet via the encrypted tunnel to the VPN server. In this way, the VSP control infrastructure and the client application may avoid communications transmitted by the user device to the one or more endpoints being transmitted via the encrypted tunnel and the VPN server. As a result, the VSP control infrastructure and the client application may enable efficient utilization of VPN resources (e.g., processing resources, management resources, memory resources, network bandwidth, power consumption, etc.) to perform suitable tasks associated with providing VPN services and/or mesh network services. Additionally, the VSP control infrastructure and the client application may avoid unnecessary addition of a plurality of hops between the user device and the one or more endpoints, thereby mitigating increase in consumption of network resources and avoiding introducing a delay in the data being received by the one or more endpoints. The VSP control infrastructure and the client application may also enable optimum utilization of existing mesh network resources (e.g., connection between the first user device and the second user device) that are dedicated for communication of data between the user device and the one or more endpoints. Further, a single client application provided by the VSP control infrastructure may enable the user device to securely communicate data in the mesh network and to privately communicate data via the VPN network, thereby enabling conservation and efficient utilization of user device resources (e.g., processing resources, memory resources, power consumption, battery life, etc.).

In some aspects, a processor (e.g., processing unit 116) associated with a user device may establish a virtual private network (VPN) connection with a VPN server and a meshnet connection with an endpoint in a mesh network, and may be configured to: determine that a destination associated with a transmission packet to be transmitted by the device is the endpoint; and transmit the transmission packet utilizing the meshnet connection based at least in part on determining that the destination is the endpoint.

FIG. 3 is an illustration of an example flow 300 associated with enabling a secure mesh network, according to various aspects of the present disclosure. The example flow 300 may include a first user device (e.g., first endpoint), a VSP control infrastructure 104, and a second user device (e.g., second endpoint) in communication with each other. In some aspects, the first user device and the second user device may be similar to a user device 102 discussed above with respect to FIG. 1. The first user device and the second user device may be located locally (e.g., in the same room, in the same building, etc.) or may be located remotely (e.g., in different buildings, in different cities, in different states, in different countries, etc.) with respect to each other. In some aspects, the first user device may install a first client application (e.g., client application 114) and the second user device may install a second client application (e.g., client application 114), the first client application and the second client application being associated with the VSP control infrastructure 104. The first user device and the second user device may use the respective client applications to communicate with an application programming interface (API) and a processor (e.g., processing unit 110, processor 920) associated with the VSP control infrastructure 104. In some aspects, the first user device, the VSP control infrastructure 104, and the second user device may communicate with each other over a network (e.g., network 118). As discussed elsewhere herein, the VSP control infrastructure may enable the first user device and/or the second user device to obtain VPN services and/or mesh network services. Although only two user devices (e.g., endpoints) are discussed with respect to FIG. 3, the present disclosure contemplates the VSP control infrastructure 104 to provide the VPN services and/or mesh network services to any number of user devices.

In some aspects, the client applications may enable the user devices to receive information to be processed by the client applications and/or by the VSP control infrastructure 104. Each of the client applications may include respective graphical user interfaces to receive the information via local input interfaces (e.g., touch screen, keyboard, mouse, pointer, etc.) associated with the user devices. The information may be received via text input or via a selection from among a plurality of options (e.g., pull down menu, etc.). In some aspects, the first client application and/or the second client application may activate and/or enable, at a time associated with the registration (e.g., after the registration), the graphical interface for receiving the information. For instance, the first client application (or the second client application) may cause a screen (e.g., local screen) associated with the first user device (or the second user device) to display, for example, a pop-up message to request entry of the information. Further, the client applications may enable transmission of at least a portion of the information to the VSP control infrastructure 104. In some aspects, the first client application may utilize a first processing unit (e.g., processing unit 116) included in the first user device to perform processes/operations associated with obtaining the VPN services and/or mesh network services and the second application may utilize a second processing unit (e.g., processing unit 116) included in the second user device to perform processes/operations associated with obtaining the VPN services and/or mesh network services.

As shown by reference numeral 310, the first user device may register a first account with the VSP control infrastructure 104 and the second user device may register a second account with the VSP control infrastructure 104. In some aspects, during registration, the first user device may provide registration information such as, for example, identity of an owner of the first user device, a phone number associated with the first user device, an email address associated with the first user device, or the like. In some aspects, the first user device may set up an access system including login information (e.g., access information) such as, for example, username, password, or the like to subsequently gain access to the first account. Similarly, during registration, the second user device may provide registration information such as, for example, identity of an owner of the second user device, a phone number associated with the second user device, an email address associated with the second user device, or the like. In some aspects, the second user device may set up an access system including login information (e.g., access information) such as, for example, username, password, or the like to subsequently gain access to the second account. In some aspects, the first user device and the second user device may be associated with a single registered account and may utilize the associated access system including login information to access the single registered account.

As shown by reference numeral 320, the first client application and the second client application may determine information based at least in part on the registration of the respective accounts with the VSP control infrastructure 104. In an example, the first client application may determine a first asymmetric assigned key pair associated with the first user device. The first assigned key pair may be unique to the first user device and may include a first assigned public key and a first assigned private key. In this way, the first assigned public key and the first assigned private key may be device-specific and may be associated with the first account. In some aspects, the first assigned public key and the first assigned private key may be associated with each other via, for example, a mathematical function. As a result, data encrypted using the first assigned public key may be decrypted by utilizing the first assigned private key.

Similarly, the second client application may determine a second asymmetric assigned key pair associated with the second user device. The second assigned key pair may be unique to the second user device and may include a second assigned public key and a second assigned private key. In this way, the second assigned public key and the second assigned private key may be device-specific and may be associated with the second account. In some aspects, the second assigned public key and the second assigned private key may be associated with each other via, for example, a mathematical function. As a result, data encrypted using the second assigned public key may be decrypted by utilizing the second assigned private key.

The first user device and the second user device may use the respective login information to access the respective accounts and to communicate with the VSP control infrastructure 104. As shown by reference numeral 330, the client applications may transmit, and the VSP control infrastructure 104 may receive, at least a portion of the information determined by the client applications. For instance, the first client application may transmit, for example, the first assigned public key to the VSP control infrastructure 104. Additionally, the first client application may determine a first public IP address associated with the first user device and may transmit the first public IP address to the VSP control infrastructure 104. In some aspects, the first public IP address may include an IP address assigned by an Internet service provider (ISP) associated with providing network services to the first user device and the second public IP address may include an IP address assigned by an ISP associated with providing network services to the second user device. In some aspects, the first user device may utilize the first public IP address to communicate over the Internet. Similarly, the second client application may transmit, for example, the second assigned public key to the VSP control infrastructure 104. Additionally, the second client application may determine a second public IP address associated with the second user device and may transmit the second public IP address to the VSP control infrastructure 104. In some aspects, the first public IP address may include an IP address assigned by an Internet service provider (ISP) associated with providing network services to the first user device and the second public IP address may include an IP address assigned by an ISP associated with providing network services to the second user device. In some aspects, the first user device may utilize the first public IP address to communicate over the Internet (e.g., clearnet).

In some aspects, the VSP control infrastructure 104 may determine the first public IP address associated with the first user device and the second public IP address associated with the second user device. In an example, the VSP control infrastructure 104 may determine the first public IP address based at least in part on inspecting a first communication (e.g., IP packet) including the first assigned public key received from the first user device. In some aspects the first communication may include, for example, a header that indicates the first public IP address as a source IP address associated with the first user device. Similarly, the VSP control infrastructure 104 may determine the second public IP address based at least in part on inspecting a second communication (e.g., IP packet) including the second assigned public key received from the second user device. In some aspects the second communication may include, for example, a header that indicates the second public IP address as a source IP address associated with the second user device.

The VSP control infrastructure 104 may store and correlate the received information in association with the respective registered accounts and/or with the respective user devices. For instance, the VSP control infrastructure 104 may store and correlate the first assigned public key and the first public IP address in association with the first account and/or the first user device, and may store and correlate the second assigned public key and the second public IP address in association with the second account and/or the second user device.

In some aspects, as discussed elsewhere herein, the first user device may transmit a request to receive the VPN services and/or the mesh network services from the VSP control infrastructure 104. Based at least in part on receiving the request, as shown by reference numeral 340, the VSP control infrastructure 104 may enable the first user device to establish a connection with a VPN server associated with the VSP control infrastructure 104 (e.g., FIG. 1).

Further, as shown by reference numeral 350, the VSP control infrastructure 104 may determine that the first user device and the second user device are to be included in a given (e.g., same) secure mesh network. In some aspects, the VSP control infrastructure 104 may make such a determination regarding the secure mesh network based at least in part on the first client application (or the second client application) transmitting information indicating that the first user device and the second user device are to be included in the same secure mesh network. Such information may include, for example, identification information (e.g., type of device, etc.) associated with the second user device and/or the second account (or the first user device and/or the first account), the second public IP address (or the first public IP address), information associated with the ISP associated with providing network services to the second user device (or to the first user device), or the like.

In some aspects, the VSP control infrastructure 104 may make such a determination regarding the secure mesh network based at least in part on determining that the first user device and the second user device are communicating with the VSP control infrastructure utilizing the same registered account. In an example, the first user device (or the second user device) may share login information associated with the first account (or the second account) with the second user device (or the first user device) to enable the second user device (or the first user device) to utilize the login information to gain access to the VSP control infrastructure 104 via the first account (or the second account). In some aspects, the second user device may be associated with the first user device because the second user device may be available to a user/owner of the first user device.

Based at least in part on determining that the first user device and the second user device are to be included in the same secure mesh network, the VSP control infrastructure 104 may determine a first mesh net IP address associated with the first user device and a second mesh net IP address associated with the second user device. In some aspects, the first client application may utilize the first meshnet IP address to communicate data with one or more endpoints included in the secure mesh network and the second client application may utilize the second meshnet IP address to communicate with the one or more endpoints included in the secure mesh network. The VSP control infrastructure 104 may determine the first meshnet IP address and the second meshnet IP address from, for example, IP addresses included in a subnet associated with an internal network of the ISP. In some aspects, the VSP control infrastructure 104 may determine the first meshnet IP address and the second meshnet IP address from a pool of available reserved IP addresses.

Based at least in part on determining that the first user device and the second user device are to be included in the same secure mesh network and/or on the determining the first meshnet IP address and the second meshnet IP address, as shown by reference numeral 360, the VSP control infrastructure 104 may transmit, and the first user device may receive, the second assigned public key, the second public IP address, and the second meshnet IP address associated with the second user device. Similarly, based at least in part on determining that the first user device and the second user device are to be included in the same secure mesh network and/or on the determining the first meshnet IP address and the second meshnet IP address, as shown by reference numeral 360, the VSP control infrastructure 104 may transmit, and the second user device may receive, the first assigned public key, the first public IP address, and the first meshnet IP address associated with the first user device. As discussed below in further detail, the above transmission of assigned public keys, public IP addresses, and meshnet IP addresses may enable the first user device and/or the second user device to communicate securely and privately within the secure mesh network.

As shown by reference numeral 370, the first user device and the second user device may communicate with each other to set up a meshnet connection (e.g., an encrypted medium) for communicating encrypted data in the secure mesh network. To set up the meshnet connection, the first client application may utilize the second assigned public key and/or the second public IP address to securely (e.g., in encrypted form) communicate with the second user device, and the second client application may utilize the first assigned public key and/or the first public IP address to securely communicate with the first user device. In some aspects, the first user device and the second user device may securely/privately negotiate parameters (e.g., a symmetric encryption/decryption key) associated with the meshnet connection. In some aspects, the parameters may be randomly generated to provide optimized security to the communications. In an example, the first user device and the second user device may privately negotiate a randomly generated symmetric key that is to be utilized by the first user device and the second user device for encrypting and decrypting the data communicated via the meshnet connection. In some aspects, the symmetric key may be determined based at least in part on the first assigned public key associated with the first user device, the second assigned public key associated with the second user device, and/or a random number. Additionally, the first user device and the second user device may utilize a secure protocol (e.g., Wireguard, IP sec, etc.) to communicate the data via the meshnet connection. Further, the first user device and the second user device may start communicating encrypted data via the meshnet connection based at least in part on utilizing the negotiated parameters and the secure protocol.

In some aspects, the first user device and the second user device may establish meshnet connections with all other endpoints (e.g., the third user device and/or the fourth user device shown in FIG. 2) included in the secure mesh network in a similar and/or analogous manner. Also, the other endpoints may establish meshnet connections with all other endpoints (e.g., the third user device and/or the fourth user device) included in the secure mesh network in a similar and/or analogous manner. Also, the other endpoints may establish meshnet connections with the other endpoints included in the secure mesh network in a similar and/or analogous manner.

In some aspects, the first user device and the second user device may push (e.g., transmit) data to each other. For instance, when the first user device has data available for transmission to the second user device, the first user device may push a notification to the second user device indicating that the first user device wishes to transmit data to the second user device. In some aspects, the push notification may identify the data to be transmitted. Further, based at least in part on transmitting the push notification, the first user device may transmit the data to the second user device via the meshnet connection. In some aspects, prior to transmitting the data, the first user device may wait to receive a confirmation message from the second user device indicating that the second user device is ready to receive the data. In some aspects, the first user device may transmit the data even when the second user device is not included (e.g., temporarily disconnected) in the secure mesh network. In this case, the first client application may suspend transmission of the data and may automatically resume transmission of the data based at least in part on determining that the second user device is included (e.g., reconnected) in the secure mesh network. The second user device may push data to the first user device in a similar and/or analogous manner.

In some aspects, the first user device and the second user device may pull (e.g., request) data from each other. For instance, when the first user device wishes to receive data from the second user device, the first user device may transmit a request to the second user device indicating that the first user device wishes to receive data from the second user device. In some aspects, the request may identify the data to be received. Further, based at least in part on receiving the request, the second user device may transmit the data to the first user device via the meshnet connection. In some aspects, the first user device may transmit the request even when the second user device is not included (e.g., temporarily disconnected) from the secure mesh network. In this case, the first client application may suspend transmission of the request and may automatically resume transmission of the request based at least in part on determining that the second user device is included (e.g., reconnected) in the secure mesh network. The second user device may pull data from the first user device in a similar and/or analogous manner.

As shown by reference numeral 380, the first client application may monitor and route incoming traffic (e.g., received communication) and outgoing traffic (e.g., transmission communication) associated with the first user device. With respect to outgoing traffic, the first client application may intercept and route the outgoing traffic based at least in part on determining a destination associated with the outgoing traffic. In some aspects, although the first user device is associated with the VPN connection and with the meshnet connections, instead of routing all outgoing traffic via the VPN connection, the first client application may determine the destination associated with the outgoing traffic and may route the outgoing traffic based at least in part on the determined destination. The first client application may determine the destination based at least in part on information indicated in the outgoing traffic. In some aspects, the outgoing traffic may include a transmission communication (e.g., transmission packet to be transmitted). In an example, the first client application may analyze metadata associated with the transmission communication to determine the destination of the transmission communication. In the case that the transmission communication includes an IP packet, the first client application may analyze header information (e.g., metadata) associated with the IP packet and may determine the destination based at least in part on analyzing a destination IP address included in the header information.

When the first client application determines that the destination of the IP packet is an endpoint within the mesh network, the first client application may route the IP packet to be transmitted to the endpoint via the meshnet connection established between the first user device and the endpoint. In some aspects, the first client application may determine that the destination is an endpoint within the mesh network based at least in part on analyzing and determining the destination IP address (e.g., destination information) to include a meshnet IP address associated with the endpoint. In an example, the first client application may determine that the destination is the second user device based at least in part on analyzing and determining the destination IP address to include the second meshnet IP address associated with the second user device. In another example, the first client application may determine that the destination is the second user device based at least in part on comparing the destination IP address with one or more known meshnet IP addresses, and determining that the destination IP address matches the second meshnet IP address. In such cases, the first client application may route the IP packet to be transmitted to the second user device via the meshnet connection established between the first user device and the second user device. In some aspects, the first client application may transmit the IP packet to the second user device based at least in part on utilizing the negotiated and exchanged parameters and the secure protocol.

Alternatively, when the first client application determines that the destination of the IP packet is a device other than an endpoint within the mesh network, the first client application may route the IP packet to be transmitted to the device via the VPN connection established between the first user device and the VPN server. In some aspects, the first client application may determine that the destination is a device other than the endpoint within the mesh network based at least in part on analyzing and determining the destination IP address (e.g., destination information) to not include the meshnet IP address associated with an endpoint. In an example, the first client application may determine that the destination is a device other than the second user device (or the third user device or the fourth user device) based at least in part on analyzing and determining the destination IP address to not include the second meshnet IP address associated with the second user device (or a third meshnet IP address associated with the third user device or a fourth meshnet IP address associated with the fourth user device). In another example, the first client application may determine that the destination is a device other than the second user device (or the third user device or the fourth user device) based at least in part on comparing the destination IP address with one or more known meshnet IP addresses, and determining that the destination IP address fails to match any known meshnet IP address (e.g., the second meshnet IP address, the third meshnet IP address, or the fourth meshnet IP address). In such cases, the first client application may route the IP packet to be transmitted to the device other than the second user device (or the third user device for the fourth user device) via the VPN connection established between the first user device and the VPN server.

By utilizing the above systems and techniques associated with enabling efficient communication in a hybrid network, the VSP control infrastructure and the client application may avoid all communications transmitted by the user device being transmitted via the encrypted tunnel. As a result, the VSP control infrastructure and the client application may enable efficient utilization of VPN resources (e.g., processing resources, management resources, memory resources, network bandwidth, power consumption, etc.) to perform suitable tasks associated with providing VPN services and/or mesh network services. Additionally, the VSP control infrastructure and the client application may avoid unnecessary addition of a plurality of hops between the user device and the one or more endpoints, thereby mitigating increase in consumption of network resources and avoiding introducing a delay in the data being received by the one or more endpoints. The VSP control infrastructure and the client application may also enable optimum utilization of existing mesh network resources (e.g., connection between the first user device and the second user device) that are dedicated for communication of data between the user device and the one or more endpoints. Further, a single client application provided by the VSP control infrastructure may enable the user device to securely communicate data in the mesh network and to privately communicate data via the VPN network, thereby enabling conservation of user device resources (e.g., processing resources, memory resources, power consumption, battery life, etc.).

As indicated above, FIG. 3 is provided as an example. Other examples may differ from what is described with regard to FIG. 3.

FIG. 4 is an illustration of an example process 400 associated with enabling efficient communication in a hybrid network, according to various aspects of the present disclosure. In some aspects, the process 400 may be performed by a memory and/or a processor/controller (e.g., processing unit 116, processor 920) associated with a user device (e.g., user device 102) executing a client application. As shown by reference numeral 410, process 400 may include determining, by a first device having an established virtual private network (VPN) connection with a VPN server and an established meshnet connection with a second device in a mesh network, that a destination associated with a transmission packet to be transmitted by the first device is the second device in the mesh network. For instance, the user device may utilize the associated memory and/or processor to determine, by a first device having an established virtual private network (VPN) connection with a VPN server and an established meshnet connection with a second device in a mesh network, that a destination associated with a transmission packet to be transmitted by the first device is the second device in the mesh network, as discussed elsewhere herein.

As shown by reference numeral 420, process 400 may include transmitting, by the first device, the transmission packet utilizing the meshnet connection based at least in part on determining that the destination is the second device in the mesh network. For instance, the user device may utilize a communication interface (e.g., communication interface 970) and the associated memory and/or processor to transmit the transmission packet utilizing the meshnet connection based at least in part on determining that the destination is the second device in the mesh network, as discussed elsewhere herein.

Process 400 may include additional aspects, such as any single aspect or any combination of aspects described below and/or in connection with one or more other processes described elsewhere herein.

In a first aspect, in process 400, determining that the destination is the second device includes determining that destination information in the transmission packet includes a meshnet address associated with the second device.

In a second aspect, alone or in combination with the first aspect, in process 400, determining that the destination is the second device includes comparing destination information in the transmission packet with a meshnet address associated with the second device.

In a third aspect, alone or in combination with the first through second aspects, in process 400, transmitting the transmission packet includes encrypting data included in the transmission packet utilizing a symmetric encryption key.

In a fourth aspect, alone or in combination with the first through third aspects, process 400 may include communicating with the second device to determine a symmetric key to be utilized for encrypting or decrypting data communicated over the meshnet connection.

In a fifth aspect, alone or in combination with the first through fourth aspects, process 400 may include utilizing a single client application to establish the VPN connection and the meshnet connection.

In a sixth aspect, alone or in combination with the first through fifth aspects, process 400 may include establishing the VPN connection with the VPN server; and establishing the meshnet connection with the second device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with enabling efficient communication in a hybrid network, according to various aspects of the present disclosure. In some aspects, the process 500 may be performed by a memory and/or a processor/controller (e.g., processing unit 116, processor 920) associated with a user device (e.g., user device 102) executing a client application. As shown by reference numeral 510, process 500 may include determining, by a first device having an established virtual private network (VPN) connection with a VPN server and an established meshnet connection with a second device in a mesh network, a transmission packet to be transmitted by the first device. For instance, the user device may utilize an associated communication interface (e.g., communication interface 970) along with the memory and/or processor to determine, while having an established virtual private network (VPN) connection with a VPN server and an established meshnet connection with a second device in a mesh network, a transmission packet to be transmitted by the first device, as discussed elsewhere herein.

As shown by reference numeral 520, process 500 may include transmitting, by the first device, the transmission packet to the second device utilizing the meshnet connection based at least in part on determining that a destination associated with the transmission packet is the second device or to the VPN server utilizing the VPN connection based at least in part on determining that the destination associated with the transmission packet is a device other than the second device. For instance, the user device may utilize an associated communication interface (e.g., communication interface 970), memory, and/or processor to transmit the transmission packet to the second device utilizing the meshnet connection based at least in part on determining that a destination associated with the transmission packet is the second device or to the VPN server utilizing the VPN connection based at least in part on determining that the destination associated with the transmission packet is a device other than the second device, as discussed elsewhere herein.

Process 500 may include additional aspects, such as any single aspect or any combination of aspects described below and/or in connection with one or more other processes described elsewhere herein.

In a first aspect, process 500 may include determining, by the first device, whether the transmission packet is to be transmitted to the second device by utilizing the meshnet connection or to the VPN server by utilizing the VPN connection based at least in part on metadata included in the transmission packet.

In a second aspect, alone or in combination with the first aspect, process 500 may include determining, by the first device, whether the transmission packet is to be transmitted to the second device by utilizing the meshnet connection or to the VPN server by utilizing the VPN connection based at least in part on a result of comparing a destination address associated with the transmission packet and a meshnet address associated with the second device.

In a third aspect, alone or in combination with the first through second aspects, process 500 may include determining, by the first device, whether the transmission packet is to be transmitted to the second device by utilizing the meshnet connection or to the VPN server by utilizing the VPN connection based at least in part on determining whether a destination address associated with the transmission packet includes a meshnet address associated with the second device.

In a fourth aspect, alone or in combination with the first through third aspects, process 500 may include comparing destination information associated with the transmission packet with a meshnet address associated with the second device to determine whether the transmission packet is to be transmitted to the second device by utilizing the meshnet connection or to the VPN server by utilizing the VPN connection.

In a fifth aspect, alone or in combination with the first through fourth aspects, in process 500, transmitting the transmission packet includes transmitting the transmission packet to the second device or to the VPN server by utilizing a single client application.

In a sixth aspect, alone or in combination with the first through fifth aspects, in process 500, transmitting the transmission packet to the second device includes encrypting the transmission packet by utilizing a symmetric key negotiated between the first device and the second device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with enabling efficient communication in a hybrid network, according to various aspects of the present disclosure. In some aspects, the process 600 may be performed by a memory and/or a processor/controller (e.g., processing unit 116, processor 920) associated with a user device (e.g., user device 102) executing a client application. As shown by reference numeral 610, process 600 may include monitoring, by a processor associated with a first device having an established VPN connection with a VPN server and an established meshnet connection with a second device, transmission of transmission packets to be transmitted by the first device. For instance, the user device may utilize the associated memory and/or a processor to monitor, while having an established VPN connection with a VPN server and an established meshnet connection with a second device, communication of transmission packets to be transmitted by the first device, as discussed elsewhere herein.

As shown by reference numeral 620, process 600 may include receiving, by the processor, a transmission packet to be transmitted by the first device. For instance, the user device may utilize an associated communication interface (e.g., communication interface 970), memory, and/or processor to receive a transmission packet to be transmitted by the first device, as discussed elsewhere herein.

As shown by reference numeral 630, process 600 may include determining, by the processor, a destination associated with the transmission packet based at least in part on metadata included in the transmission packet. For instance, the user device may utilize the associated memory and/or processor to determine a destination associated with the transmission packet based at least in part on metadata included in the transmission packet, as discussed elsewhere herein.

As shown by reference numeral 640, process 600 may include routing, by the processor, the transmission packet for transmission via the VPN connection or for transmission via the meshnet connection based at least in part on determining whether the second device is the destination associated with the transmission packet. For instance, the user device may utilize the associated memory and/or processor to route the transmission packet for transmission via the VPN connection or for transmission via the meshnet connection based at least in part on determining whether the second device is the destination associated with the transmission packet, as discussed elsewhere herein.

Process 600 may include additional aspects, such as any single aspect or any combination of aspects described below and/or in connection with one or more other processes described elsewhere herein.

In a first aspect, in process 600, routing the transmission packet includes routing the transmission packet for transmission via the VPN connection based at least in part on determining that the second device is not the destination associated with the transmission packet.

In a second aspect, alone or in combination with the first aspect, in process 600, routing the transmission packet includes routing the transmission packet for transmission via the meshnet connection based at least in part on determining that the second device is the destination associated with the transmission packet.

In a third aspect, alone or in combination with the first through second aspects, in process 600, routing the transmission packet includes utilizing a single client application to route the transmission packet for transmission via the VPN connection or for transmission via the meshnet connection.

In a fourth aspect, alone or in combination with the first through third aspects, in process 600, routing the transmission packet for transmission via the meshnet connection includes encrypting the transmission packet by utilizing a symmetric key negotiated between the first device and the second device.

In a fifth aspect, alone or in combination with the first through fourth aspects, in process 600, determining that the second device is the destination associated with the transmission packet includes determining that a destination address associated with the transmission packet matches a meshnet address associated with the second device.

In a sixth aspect, alone or in combination with the first through fifth aspects, in process 600, determining that the second device is the destination associated with the transmission packet includes determining that a destination address associated with the transmission packet includes a meshnet address associated with the second device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of an example process 700 associated with enabling efficient communication in a hybrid network, according to various aspects of the present disclosure. In some aspects, the process 700 may be performed by a memory and/or a processor/controller (e.g., processing unit 116, processor 920) associated with a user device (e.g., user device 102) executing a client application. As shown by reference numeral 710, process 700 may include establishing, by a first device, a virtual private network (VPN) connection with a VPN server. For instance, the user device may utilize an associated communication interface (e.g., communication interface 970) with the associated memory and/or a processor to establish a virtual private network (VPN) connection with a VPN server, as discussed elsewhere herein.

As shown by reference numeral 720, process 700 may include establishing, by the first device during the established VPN connection, a meshnet connection with a second device in a mesh network. For instance, the user device may utilize the associated communication interface, memory, and/or processor to establish, during the established VPN connection, a meshnet connection with a second device in a mesh network, as discussed elsewhere herein.

As shown by reference numeral 730, process 700 may include determining, by the first device, whether the second device is a destination associated with a transmission packet to be transmitted by the first device. For instance, the user device may utilize the associated memory and/or processor to determine whether the second device is a destination associated with a transmission packet to be transmitted by the first device, as discussed elsewhere herein.

As shown by reference numeral 740, process 700 may include transmitting, by the processor, the transmission packet by utilizing the VPN connection or by utilizing the meshnet connection based at least in part on determining whether the second device is the destination associated with the transmission packet. For instance, the user device may utilize the associated communication interface, memory, and/or processor to transmit the transmission packet by utilizing the VPN connection or by utilizing the meshnet connection based at least in part on determining whether the second device is the destination associated with the transmission packet, as discussed elsewhere herein.

Process 700 may include additional aspects, such as any single aspect or any combination of aspects described below and/or in connection with one or more other processes described elsewhere herein.

In a first aspect, in process 700, transmitting the transmission packet includes transmitting the transmission packet by utilizing the VPN connection based at least in part on determining that the second device is not the destination associated with the transmission packet.

In a second aspect, alone or in combination with the first aspect, in process 700, transmitting the transmission packet includes transmitting the transmission packet by utilizing the meshnet connection based at least in part on determining that the second device is the destination associated with the transmission packet.

In a third aspect, alone or in combination with the first through second aspects, in process 700, transmitting the transmission packet includes transmitting the transmission packet by utilizing the VPN connection or by utilizing the meshnet connection via a single client application.

In a fourth aspect, alone or in combination with the first through third aspects, in process 700, transmitting the transmission packet by utilizing the meshnet connection includes encrypting the transmission packet by utilizing a symmetric key negotiated between the first device and the second device.

In a fifth aspect, alone or in combination with the first through fourth aspects, in process 700, determining that the second device is the destination associated with the transmission packet includes comparing destination information associated with the transmission packet with a meshnet address associated with the second device.

In a sixth aspect, alone or in combination with the first through fifth aspects, in process 700, the transmission packet includes metadata indicating the destination associated with the transmission packet.

Although FIG. 7 shows example blocks of the process, in some aspects, the process may include additional blocks, fewer blocks, different blocks, or differently arranged blocks than those depicted in FIG. 7. Additionally, or alternatively, two or more of the blocks of the process may be performed in parallel.

As indicated above, FIG. 7 is provided as an example. Other examples may differ from what is described with regard to FIG. 7.

FIG. 8 is an illustration of an example process 800 associated with enabling efficient communication in a hybrid network, according to various aspects of the present disclosure. In some aspects, the process 800 may be performed by a memory and/or a processor/controller (e.g., processing unit 116, processor 920) associated with a VSP control infrastructure (e.g., VSP control infrastructure 104). As shown by reference numeral 810, process 800 may include determining, by a first device having an established virtual private network (VPN) connection with a VPN server and an established meshnet connection with a second device in a mesh network, a transmission packet to be transmitted by the first device. For instance, the VSP control infrastructure may utilize the associated memory and/or a processor to enable a device to determine, while having an established virtual private network (VPN) connection with a VPN server and an established meshnet connection with a second device in a mesh network, a transmission packet to be transmitted by the first device, as discussed elsewhere herein.

As shown by reference numeral 820, process 800 may include determining, by the first device, whether the transmission packet is to be transmitted by utilizing the VPN connection or by utilizing the meshnet connection based at least in part on determining a destination associated with the transmission packet. For instance, the VSP control infrastructure may utilize the associated memory and/or processor to determine whether the transmission packet is to be transmitted by utilizing the VPN connection or by utilizing the meshnet connection based at least in part on determining a destination associated with the transmission packet, as discussed elsewhere herein.

Process 800 may include additional aspects, such as any single aspect or any combination of aspects described below and/or in connection with one or more other processes described elsewhere herein.

In a first aspect, in process 800, determining whether the transmission packet is to be transmitted by utilizing the VPN connection or by utilizing the meshnet connection includes determining that the transmission packet is to be transmitted by utilizing the VPN connection based at least in part on determining that the destination associated with the transmission packet is a device other than the second device.

In a second aspect, alone or in combination with the first aspect, in process 800, determining whether the transmission packet is to be transmitted by utilizing the VPN connection or by utilizing the meshnet connection includes determining that the transmission packet is to be transmitted by utilizing the meshnet connection based at least in part on determining that the destination associated with the transmission packet is the second device.

In a third aspect, alone or in combination with the first through second aspects, in process 800, determining the destination associated with the transmission packet includes comparing destination information associated with the transmission packet with a meshnet address associated with the second device.

In a fourth aspect, alone or in combination with the first through third aspects, process 800 may include transmitting, via a single client application, the transmission packet by utilizing the VPN connection or by utilizing the meshnet connection.

In a fifth aspect, alone or in combination with the first through fourth aspects, process 800 may include encrypting, by the first device, the transmission packet by utilizing a symmetric key negotiated between the first device and the second device based at least in part on determining that the destination associated with the transmission packet is the second device.

In a sixth aspect, alone or in combination with the first through fifth aspects, in process 800, the transmission packet includes metadata indicating the destination associated with the transmission packet.

Although FIG. 8 shows example blocks of the process, in some aspects, the process may include additional blocks, fewer blocks, different blocks, or differently arranged blocks than those depicted in FIG. 8. Additionally, or alternatively, two or more of the blocks of the process may be performed in parallel.

As indicated above, FIG. 8 is provided as an example. Other examples may differ from what is described with regard to FIG. 8.

FIG. 9 is an illustration of example devices 900 associated with enabling efficient communication in a hybrid network, according to various aspects of the present disclosure. In some aspects, the example devices 900 may form part of or implement the systems, servers, environments, infrastructures, components, devices, or the like described elsewhere herein (e.g., VSP control infrastructure, VPN server, user device, etc.) and may be used to perform example processes described elsewhere herein. The example devices 900 may include a universal bus 910 communicatively coupling a processor 920, a memory 930, a storage component 940, an input component 950, an output component 960, and a communication interface 970.

Bus 910 may include a component that permits communication among multiple components of a device 900. Processor 920 may be implemented in hardware, firmware, and/or a combination of hardware and software. Processor 920 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 920 may include one or more processors capable of being programmed to perform a function. Memory 930 may include a random access memory (RAM), a read only memory (ROM), and/or another type of dynamic or static storage device (e.g., a flash memory, a magnetic memory, and/or an optical memory) that stores information and/or instructions for use by processor 920.

Storage component 940 may store information and/or software related to the operation and use of a device 900. For example, storage component 940 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 950 may include a component that permits a device 900 to receive information, such as via user input (e.g., a touch screen display, a keyboard, a keypad, a mouse, a button, a switch, and/or a microphone). Additionally, or alternatively, input component 950 may include a component for determining location (e.g., a global positioning system (GPS) component) and/or a sensor (e.g., an accelerometer, a gyroscope, an actuator, another type of positional or environmental sensor, and/or the like). Output component 960 may include a component that provides output information from device 900 (via, for example, a display, a speaker, a haptic feedback component, an audio or visual indicator, and/or the like).

Communication interface 970 may include a transceiver-like component (e.g., a transceiver, a separate receiver, a separate transmitter, and/or the like) that enables a device 900 to communicate with other devices, such as via a wired connection, a wireless connection, or a combination of wired and wireless connections. Communication interface 970 may permit device 900 to receive information from another device and/or provide information to another device. For example, communication interface 970 may include an Ethernet interface, an optical interface, a coaxial interface, an infrared interface, a radio frequency (RF) interface, a universal serial bus (USB) interface, a Wi-Fi interface, a cellular network interface, and/or the like.

A device 900 may perform one or more processes described elsewhere herein. A device 900 may perform these processes based on processor 920 executing software instructions stored by a non-transitory computer-readable medium, such as memory 930 and/or storage component 940. As used herein, the term "computer-readable medium" may refer to a non-transitory memory device. A memory device may include memory space within a single physical storage device or memory space spread across multiple physical storage devices.

Software instructions may be read into memory 930 and/or storage component 940 from another computer-readable medium or from another device via communication interface 970. When executed, software instructions stored in memory 930 and/or storage component 940 may cause processor 920 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 9 are provided as an example. In practice, a device 900 may include additional components, fewer components, different components, or differently arranged components than those shown in FIG. 9. Additionally, or alternatively, a set of components (e.g., one or more components) of a device 900 may perform one or more functions described as being performed by another set of components of a device 900.

As indicated above, FIG. 9 is provided as an example. Other examples may differ from what is described with regard to FIG. 9.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   monitoring, by a processor associated with a first device having an established VPN connection with a VPN server and an established meshnet connection with a second device, communication of transmission packets to be transmitted by the first device;
   receiving, by the processor, a transmission packet to be transmitted by the first device;
   determining, by the processor, a destination associated with the transmission packet based at least in part on metadata included in the transmission packet; and
   routing, by the processor, the transmission packet for transmission via the VPN connection instead of the established meshnet connection or for transmission via the meshnet connection instead of the established VPN connection based at least in part on determining whether the second device is the destination associated with the transmission packet.

2. The method of claim 1, wherein routing the transmission packet includes routing the transmission packet for transmission via the VPN connection based at least in part on determining that the second device is not the destination associated with the transmission packet.

3. The method of claim 1, wherein routing the transmission packet includes routing the transmission packet for transmission via the meshnet connection based at least in part on determining that the second device is the destination associated with the transmission packet.

4. The method of claim 1, wherein routing the transmission packet includes utilizing a single client application to route the transmission packet for transmission via the VPN connection or for transmission via the meshnet connection.

5. The method of claim 1, wherein routing the transmission packet for transmission via the meshnet connection includes encrypting the transmission packet by utilizing a symmetric key negotiated between the first device and the second device.

6. The method of claim 1, wherein determining that the second device is the destination associated with the transmission packet includes determining that a destination address associated with the transmission packet matches a meshnet address associated with the second device.

7. The method of claim 1, wherein determining that the second device is the destination associated with the transmission packet includes determining that a destination address associated with the transmission packet includes a meshnet address associated with the second device.

8. A first device, comprising:
a memory; and
a processor communicatively coupled to the memory, the memory and the processor being configured to:
monitor, while having an established VPN connection with a VPN server and an established meshnet connection with a second device, communication of transmission packets to be transmitted by the first device;
receive a transmission packet to be transmitted by the first device;
determine a destination associated with the transmission packet based at least in part on metadata included in the transmission packet; and
route the transmission packet for transmission via the VPN connection instead of the established meshnet connection or for transmission via the meshnet connection instead of the established VPN connection based at least in part on determining whether the second device is the destination associated with the transmission packet.

9. The first device of claim 8, wherein, to route the transmission packet, the memory and the processor are configured to route the transmission packet for transmission via the VPN connection based at least in part on determining that the second device is not the destination associated with the transmission packet.

10. The first device of claim 8, wherein, to route the transmission packet, the memory and the processor are configured route the transmission packet for transmission via the meshnet connection based at least in part on determining that the second device is the destination associated with the transmission packet.

11. The first device of claim 8, wherein, to route the transmission packet, the memory and the processor are configured to utilize a single client application to route the transmission packet for transmission via the VPN connection or for transmission via the meshnet connection.

12. The first device of claim 8, wherein, to route the transmission packet for transmission via the meshnet connection, the memory and the processor are configured to encrypt the transmission packet by utilizing a symmetric key negotiated between the first device and the second device.

13. The first device of claim 8, wherein, to determine that the second device is the destination associated with the transmission packet, the memory and the processor are configured to determine that a destination address associated with the transmission packet matches a meshnet address associated with the second device.

14. The first device of claim 8, wherein, to determine that the second device is the destination associated with the transmission packet, the memory and the processor are configured to determine that a destination address associated with the transmission packet includes a meshnet address associated with the second device.

15. A non-transitory computer-readable medium configured to store instructions, which when executed by a processor associated with a first device, cause the processor to:
monitor, while having an established VPN connection with a VPN server and an established meshnet connection with a second device, communication of transmission packets to be transmitted by the first device;
receive a transmission packet to be transmitted by the first device;
determine a destination associated with the transmission packet based at least in part on metadata included in the transmission packet; and
route the transmission packet for transmission via the VPN connection instead of the established meshnet connection or for transmission via the meshnet connection instead of the established VPN connection based at least in part on determining whether the second device is the destination associated with the transmission packet.

16. The non-transitory computer-readable medium of claim 15, wherein, to route the transmission packet, the processor is configured to route the transmission packet for transmission via the VPN connection based at least in part on determining that the second device is not the destination associated with the transmission packet.

17. The non-transitory computer-readable medium of claim 15, wherein, to route the transmission packet, the processor is configured route the transmission packet for transmission via the meshnet connection based at least in part on determining that the second device is the destination associated with the transmission packet.

18. The non-transitory computer-readable medium of claim 15, wherein, to route the transmission packet, the processor is configured to utilize a single client application to route the transmission packet for transmission via the VPN connection or for transmission via the meshnet connection.

19. The non-transitory computer-readable medium of claim 15, wherein, to route the transmission packet for transmission via the meshnet connection, the processor is configured to encrypt the transmission packet by utilizing a symmetric key negotiated between the first device and the second device.

20. The non-transitory computer-readable medium of claim 15, wherein, to determine that the second device is the destination associated with the transmission packet, the processor is configured to determine that a destination address associated with the transmission packet matches a meshnet address associated with the second device.

* * * * *